Patented Oct. 30, 1951

2,573,656

UNITED STATES PATENT OFFICE 2,573,656

HYDROLYSIS OF ACETYLAMINONITRO-THIAZOLE

George W. Steahly, Maplewood, Mo., assignor to Monsanto Chemical Company, St. Louis, Mo., a corporation of Delaware No Drawing. Application July 22, 1950, Serial No. 175,488

16 Claims. (Cl. 260—306.8)

This invention relates to acetylaminonitrothiazole; more specifically, this invention relates to an improvement in the process for the hydrolysis of acetylaminonitrothiazole to form aminonitrothiazole.

As is well known in the art, acetylaminonitrothiazole can be hydrolyzed by treating it with a mineral acid. Although the thiazole nucleus is considered to be fairly stable in acid solutions, it was found that the yield of aminonitrothiazole varied considerably in successive attempts at the mineral acid hydrolysis of acetylaminonitrothiazole. It is, therefore, an object of this invention to provide an improvement in the process for the mineral acid hydrolysis of acetylaminonitrothiazole. Further objects will become apparent from a description of the novel process of this invention.

It has now been discovered that the time and temperature of this hydrolysis reaction are most significant from the standpoint of obtaining consistently good yields of aminonitrothiazole. According to the novel process of this invention, therefore, acetylaminonitrothiazole is hydrolyzed by boiling under reflux conditions an aqueous mineral acid solution of acetylaminonitrothiazole for a period of time not exceeding about one hour. The following examples are illustrative of the novel process of this invention:

Example I 65 g. of 2-acetylamino-5-nitrothiazole are dissolved in 180 g. of 100% sulfuric acid and 600 g. of water. The solution is then boiled under reflux conditions, at a temperature of approximately 100° C., for a period of one hour after which time the solution is rapidly cooled to 20–25° C. and filtered. The filtrate is then neutralized with approximately 350 g. of sodium acetate, thereby precipitating 2-amino-5-nitrothiazole. The 2-amino-5-nitrothiazole is recovered by filtration, washed with water and dried by heating to a temperature of 60° C. under reduced pressure. A 65% yield of 2-amino-5-nitrothiazole, based upon 2-acetylamino-5-nitrothiazole charged, having a melting point of 197–198° C., is obtained.

Example II

The procedure set forth in Example I is repeated with the exception that the solution is refluxed for a period of two hours instead of one hour. A 46.5% yield of 2-amino-5-nitrothiazole is obtained.

Example III

The procedure described in Example I is repeated with the exception that the solution is refluxed for a period of four hours instead of one hour. A 22.5% yield of 2-amino-5-nitrothiazole is obtained.

Example IV

The procedure set forth in Example I is repeated utilizing in place of the 180 g. of 100% sulfuric acid and 600 ml. water, 475 g. of 18° Bé. hydrochloric acid and 225 ml. water. An excellent yield of 2-amino-5-nitrothiazole is obtained.

Example V

The procedure set forth in Example I is repeated utilizing in place of the 180 g. of sulfuric acid, 145 g. of 85% phosphoric acid. An excellent yield of 2-amino-5-nitrothiazole is obtained.

Example VI

The procedure set forth in Example I is repeated utilizing in place of the 2-acetylamino-5-nitrothiazole, 2-acetylamino-4-nitrothiazole. An excellent yield of 2-amino-4-nitrothiazole is obtained.

Example VII

The procedure set forth in Example II is repeated utilizing in place of the 2-acetylamino-5-nitrothiazole, 4-acetylamino-5-nitrothiazole. An excellent yield of 4-amino-5-nitrothiazole is obtained.

Example VIII

The procedure set forth in Example I is repeated with the exception that the solution is heated to a temperature of about 85° C. for a period of four hours instead of refluxing at about 100° C. for a period of one hour. An extremely low yield of 2-amino-5-nitrothiazole is obtained.

While the preceding examples have illustrated specific reactants and reaction conditions, it will be obvious to those skilled in the art that substantial variation is possible in carrying out the novel improved process of this invention. For example, any of the mineral acids may be utilized in the hydrolysis of acetylaminonitrothiazole. These acids include sulfuric acid, hydrochloric acid, nitric acid and phosphoric acid. At least one equivalent proportion of the mineral acid should be utilized for each molecular proportion of the acetylaminonitrothiazole. Utilizing in excess of one equivalent proportion of the mineral acid for each molecular proportion of the acetylaminonitrothiazole has no deleterious effect upon the novel improved process of this invention. Thus, quantities of the acid in the range of 10–20 equivalent proportions for each molecular proportion of the acetylaminonitrothiazole may be utilized, is desired.

Similarly, the concentration of the mineral acid in the aqueous solution of the acetylaminonitrothiazole may be substantially varied without deleteriously affecting the operability of this invention. Preferably, however, the concentration of the mineral acid in the aqueous solution of acetylaminonitrothiazole should be in the range of from about 10% to about 75% by weight of total composition.

The hydrolysis is carried out by boiling the aqueous mineral acid solution of acetylaminonitrothiazole under reflux conditions at a temperature in the range of from about 90–110° C. This operation may be carried out under atmospheric pressure, under reduced pressure or at pressures in excess of atmospheric pressure. Temperatures either higher or lower than the prescribed range significantly reduce the yield of the desired product. It is essential that the reaction mixture be boiled under reflux conditions for a period of time not exceeding one hour. As shown in Examples II and III, excessive heating periods significantly reduce the yield of the desired product.

After the hydrolysis reaction is complete, the aminonitrothiazole may be recovered from the reaction medium by any of the various methods well known to those skilled in the art. A most convenient method of recovery consists in neutralizing the reaction medium, thereby precipitating the aminonitrothiazole which may then be separated therefrom by filtration, washed and dried.

What is claimed is:

1. An improved process for the hydrolysis of acetylaminonitrothiazole which comprises boiling under reflux conditions an aqueous mineral acid solution of acetylaminonitrothiazole for a period of time not exceeding about one hour.

2. An improved process for the hydrolysis of 2-acetylamino-5-nitrothiazole which comprises boiling under reflux conditions an aqueous mineral acid solution of 2-acetylamino-5-nitrothiazole for a period of time not exceeding one hour.

3. An improved process for the hydrolysis of 2-acetylamino-5-nitrothiazole which comprises boiling under reflux conditions an aqueous sulfuric acid solution of 2-acetylamino-5-nitrothiazole for a period of time not exceeding one hour.

4. An improved process for the hydrolysis of 2-acetylamino-5-nitrothiazole which comprises boiling under reflux conditions an aqueous hydrochloric acid solution of 2-acetylamino-5-nitrothiazole for a period of time not exceeding one hour.

5. An improved process for the hydrolysis of acetylaminonitrothiazole which comprises boiling under reflux conditions at a temperature in the range of from about 90° to about 110° C., an aqueous mineral acid solution of acetylaminonitrothiazole for a period of time not exceeding one hour.

6. The process as described in claim 5 wherein the acetylaminonitrothiazole is 2-acetylamino-5-nitrothiazole.

7. An improved process for the hydrolysis of acetylaminonitrothiazole which comprises boiling under reflux conditions an aqueous mineral acid solution of acetylaminonitrothiazole for a period of time not exceeding one hour, said aqueous solution containing in excess of one equivalent proportion of said mineral acid for each molecular proportion of acetylaminonitrothiazole.

8. An improved process for the hydrolysis of acetylaminonitrothiazole which comprises boiling under reflux conditions at a temperature in the range of from about 90° to about 110° C., an aqueous mineral acid solution of acetylaminonitrothiazole for a period of time not exceeding one hour, said aqueous solution containing in excess of one equivalent proportion of said mineral acid for each molecular proportion of acetylaminonitrothiazole.

9. An improved process for the hydrolysis of acetylaminonitrothiazole which comprises boiling under reflux conditions at a temperature in the range of from about 90° to about 110° C., an aqueous sulfuric acid solution of acetylaminonitrothiazole for a period of time not exceeding about one hour, said aqueous sulfuric acid solution containing in excess of one equivalent proportion of sulfuric acid for each molecular proportion of acetylaminonitrothiazole.

10. The process as described in claim 9 wherein the acetylaminonitrothiazole is 2-acetylamino-5-nitrothiazole.

11. An improved process for the hydrolysis of acetylaminonitrothiazole which comprises boiling under reflux conditions at a temperature in the range of from about 90° to about 110° C., an aqueous hydrochloric acid solution of acetylaminonitrothiazole for a period of time not exceeding about one hour, said aqueous hydrochloric acid solution containing in excess of one equivalent proportion of hydrochloric acid for each molecular proportion of acetylaminonitrothiazole.

12. An improved process for the hydrolysis of acetylaminonitrothiazole which comprises boiling under reflux conditions at a temperature in the range of from about 90° to about 110° C., an aqueous mineral acid solution of acetylaminonitrothiazole for a period of time not exceeding one hour, said aqueous solution containing from about 10% to about 75% by weight of the mineral acid and in excess of one equivalent proportion of said mineral acid for each molecular proportion of acetylaminonitrothiazole.

13. An improved process for the hydrolysis of acetylaminonitrothiazole which comprises boiling under reflux conditions at a temperature in the range of from about 90° to about 110° C., an aqueous sulfuric acid solution of acetylaminonitrothiazole for a period of time not exceeding one hour, said aqueous sulfuric acid solution containing from about 10% to about 75% by weight of sulfuric acid and in excess of one equivalent proportion of sulfuric acid for each molecular proportion of acetylaminonitrothiazole.

14. The process as described in claim 13 wherein the acetylaminonitrothiazole is 2-acetylamino-5-nitrothiazole.

15. An improved process for the hydrolysis of acetylaminonitrothiazole which comprises boiling under reflux conditions at a temperature in the range of from about 90° to about 110° C., an aqueous hydrochloric acid solution of acetylaminonitrothiazole for a period of time not exceeding one hour, said aqueous hydrochloric acid solution containing from about 10% to about 75% by weight of hydrochloric acid and in excess of one equivalent proportion of hydrochloric acid for each molecular proportion of acetylaminonitrothiazole.

16. The process as described in claim 15 wherein the acetylaminonitrothiazole is 2-acetylamino-5-nitrothiazole.

GEORGE W. STEAHLY.

REFERENCES CITED

The following references are of record in the file of this patent:

Chemical Abstracts, vol. 40, pages 4056–4060, citing Ganapathi et al., Proc. Indian Acad. Sci. 22A, pages 348–358 (1945).